June 5, 1956     J. W. DODDS     2,748,794
LOCKABLE VALVE
Filed April 29, 1955
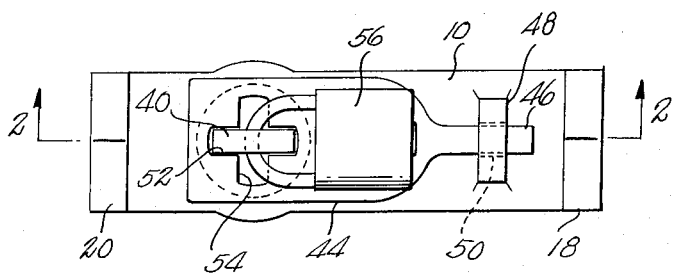
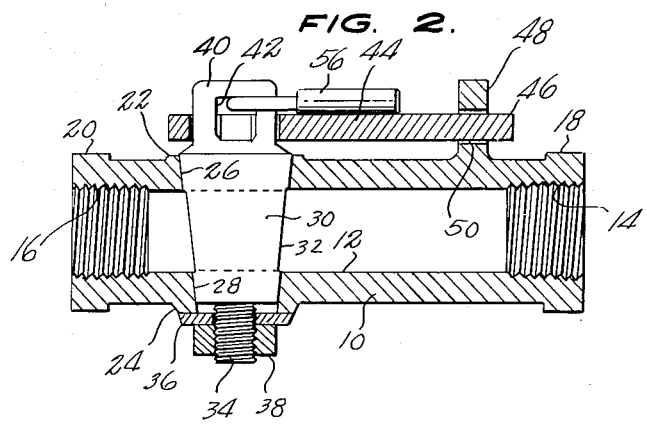
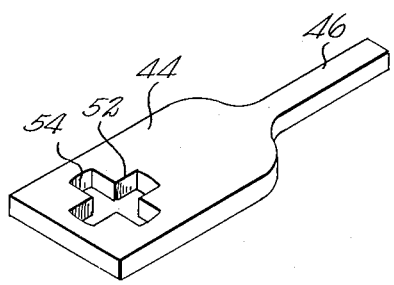
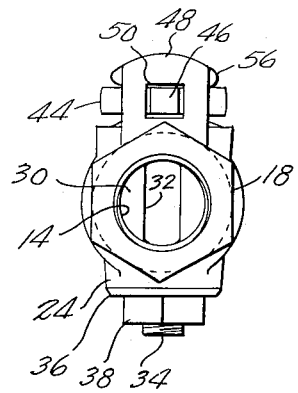
INVENTOR.
JOHN W. DODDS,
BY
McMorrow, Berman + Davidson
ATTORNEYS.

United States Patent Office 2,748,794
Patented June 5, 1956

2,748,794

LOCKABLE VALVE

John W. Dodds, Rubedoux, Calif.

Application April 29, 1955, Serial No. 504,840

1 Claim. (Cl. 137—385)

This invention relates to a valve construction, and more particularly has reference to a valve so designed as to permit the same to be locked in each of flow-permitting and flow-preventing positions thereof.

The desirability of locking a valve, particularly a valve in an exposed location, is well appreciated in the art to which the invention relates. Often, for example, a valve or stop lock has a handle portion projecting a substantial distance outwardly from an associated conduit, and when heavy objects are dragged across the conduit, they tend to strike the valve handle, so as to accidentally turn the valve. Still further, when a valve handle is located in an exposed area accessible, for example, to the general public, unauthorized individuals may tamper therewith, causing the valve to be opened or closed at times when this is not desired, that is, such an individual may open a valve which is to be left in closed position, and vice versa.

The main object of the present invention is to provide a generally improved valve construction which will be so designed as to permit the same to be locked with speed and ease in either a flow permitting or flow-preventing position, whichever is desired, thus to prevent accidental opening or closing of the valve and thus to prevent, further, unauthorized handling of the valve.

Another object of importance is to provide a valve as described wherein the locking means associated therewith is simply formed, so as to permit construction of the valve at little or no increase in cost above that required for valves not having this beneficial characteristic.

Yet another object of importance is to provide a valve construction as stated wherein the locking means will be disposed in a position in which it does not project outwardly of the casing except to a relatively small extent, so as to reduce measurably the danger of an object accidentally striking the valve and locking means under circumstances which may tend to damage the valve or the conduit associated therewith.

Yet another object of importance is to provide a valve construction wherein the locking means will be so designed as to permit use of the same as a handle for the valve, to permit the valve to be swung between open and closed positions.

Still another object of importance is to form the locking means in such manner as to permit a padlock to be connected to the valve, after the locking means has been interengaged with the valve in a manner to prevent rotatable movement thereof, with the locking means being so arranged as to cause the padlock to prevent relative separation of the locking means from the rotatable plug portion of the valve, as well as from the casing in which said plug portion is mounted.

Other objects will appear from the following description, the claims appended thereto and from the annexed drawing, in which like reference characters designate like parts throughout the several views, and wherein:

Figure 1 is a top plan view of a valve formed according to the present invention;

Figure 2 is a longitudinal sectional view therethrough substantially on line 2—2 of Figure 1;

Figure 3 is an end elevational view of the valve as seen from the right of Figure 2; and Figure 4 is a perspective view of the locking plate of the valve, per se.

The reference numeral 10 designates a relatively elongated, tubular valve casing formed open at its opposite ends and having a through axial bore 12 providing a flow passage. At its opposite ends, the bore is threaded as at 14, 16 respectively, to permit connection of the casing at said ends thereof to associated pipes or conduits, not shown. Exteriorly formed on the extremities of the casing are non-circular formations 18, 20 respectively adapted to receive a wrench or similar tool to facilitate rotatable movement of the casing during its connection or disconnection to said associated pipes or conduits.

Formed in the casing intermediate opposite ends thereof, are openings 26, 28 adapted to receive the opposite end portions of a frustro-conical valve plug 30. The openings are aligned diametrically of the casing, and are formed to different diameters, the openings being taperingly formed, so as to complement the portions of the plug 30 that are in contact therewith.

The plug 30 is rotatable through a full 360 degree cycle, but in being moved between open and closed positions, that is, between flow-permitting and flow-preventing positions, need only be turned through 90 degrees, in either direction. Permitting flow through the plug in the open position is a transverse passage or throat 32 formed therein.

Integrally formed upon the minor end of the plug 30, and projecting from the plug axially thereof, is a threaded, reduced extension or shank 34, on which can be placed a washer or gasket 36. A nut 38 is threaded upon the shank 34, against the washer, said nut being adapted to be tightened against the washer to any extent desired, so as to limit the freedom of rotatable movement of the valve plug to a corresponding extent and insure a tight seal between the wall of the plug and the casing.

Integrally formed upon the other, larger end of the plug, and extending outwardly from the casing, is a projection 40, having a centrally disposed aperture 42. The projection 40 is in the form of a relatively flat, wide bar element, and lies in a plane common to the axis of rotation of the plug, said projection extending diametrically of the plug as shown to particular advantage in Figure 1.

A locking plate 44 is formed from a length of flat, relatively wide bar stock, and at one end has a reduced, elongated, longitudinal extension 46. The extension 46 comprises a tongue adapted to pass through a projection 48 integrally formed upon the casing wall at a location spaced longitudinally of the casing from the plug, the projection 48 having a non-circular opening receiving the tongue 46, and said tongue being of a correspondingly non-circular cross section so as to prevent rotatable movement of the plate 44 relative to the projection 48.

At its other end, the plate 44 is formed with closed slots 52, 54, arranged perpendicularly to one another and intersecting at their midlength locations, the slot 52 being extended longitudinally of the plate 44 and the slot 54 extending transversely thereof. A cruciform opening is thus provided in the locking plate, and the projection 40 is adapted to be extended into said opening of the locking plate, in both flow-permitting and flow-preventing positions of the plug 30.

It will be apparent that when the plug 30 is in a flow-permitting position, such as that shown in Figures 2 and 3, the projection 40 will be engaged in the slot 52. When, on the other hand, the plug 30 is turned 90 degrees to a flow-preventing position, the projection 40 will be engaged in the transversely extending slot 54. In both of these positions, of course, the locking plate, when its tongue 46 is engaged in the projection 48, will hold the plug against rotatable movement. Accordingly, the plug can be locked in each position to which it is rotated. The extension 46, it should be noted, fits relatively loosely in the aperture 50, and similarly, the projection 40 fits loosely within the selected slot 52, or 54 as the case may be, thus to permit the locking plate 44 to be lifted off the projection 40 and then disengaged from projection 48 without binding upon either of these components of the valve.

When the locking plate has been interengaged with the projections 40, 48, in the manner previously described herein, a padlock 56 or equivalent locking means such as a lead seal can be attached to the projection 40, above the locking plate. Thus, as shown in Figures 1 and 2, the hasp of the padlock extends through the aperture 42, said aperture being extended above the plane of the locking plate 44 to provide a space through which said hasp is extendable.

Under these circumstances, the lock will effectively prevent unauthorized individuals from tampering with the valve, and further, accidental movement of the valve from a selected position to which it is rotated is effectively precluded.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles, it being considered that the invention comprehends any minor change in construction that may be permitted within the scope of the appended claims.

What is claimed is:

A valve construction adapted for locking in open and closed positions by a padlock, comprising: an elongated casing having an axial flow passage; a plug mounted in said passage for rotation about an axis normal to the length of the passage and including a flat, wide projection extending outwardly from the casing and lying in a plane common to the axis of rotation of the plug; a second flat, wide projection rigid with the casing and spaced longitudinally of the casing from the first projection, said second projection lying in a plane normal to the axis of the casing and extending outwardly from the casing a distance substantially equal to that which the first projection extends therefrom; an elongated locking plate of a length greater than the distance between said projections, said plate at one end having a flat wide portion one end of which has a cruciform opening shaped to receive the first projection, in each of open and closed positions of the plug angularly spaced 90 degrees apart about the axis of rotation of the plug, said locking plate in each of said plug positions extending longitudinally of the casing, the first projection having an opening, a padlock having a hasp received in the opening of said first projection, the other end of said portion of the lock plate forming a flat, wide surface in a plane normal to that of the first projection on which said padlock may rest, said second projection having an opening extending longitudinally of the casing and opening upon opposite faces of the second projection, said plate including an elongated extension reduced in width in respect to said portion and extending perpendicularly to the plane of the second projection through the opening thereof.

References Cited in the file of this patent
UNITED STATES PATENTS

| | | |
|---|---|---|
| 664,462 | Campbell | Dec. 25, 1900 |
| 983,842 | Scheible | Feb. 7, 1911 |
| 1,015,094 | Stift | Jan. 16, 1912 |
| 1,158,631 | Caldwell | Nov. 2, 1915 |
| 1,209,768 | Shoemaker | Dec. 26, 1916 |
| 2,271,475 | Clade | Jan. 27, 1942 |